United States Patent Office 3,315,011
Patented Apr. 18, 1967

3,315,011
THERMOSETTING COMPOSITIONS OF ALKYLATED ACRYLAMIDE - FORMALDEHYDE INTERPOLYMERS AND A PREFORMED POLYESTER CONTAINING UNREACTED 1,2-EPOXY GROUPS
Robert A. Baugh, Gibsonia, Pa., assignor to Pittsburgh Plate Glass Company, Pittsburgh, Pa., a corporation of Pennsylvania
No Drawing. Filed Oct. 16, 1963, Ser. No. 316,551
9 Claims. (Cl. 260—834)

This invention relates to resinous compositions, useful as improved coating compositions, comprising an aldehyde-modified interpolymer of an unsaturated carboxylic acid amide and a polyester containing unreacted epoxy groups in the polyester molecules.

Interpolymers of unsaturated carboxylic acid amides, and especially aldehyde-modified and etherified interpolymers of such amides with other ethylenically unsaturated monomers, have been utilized extensively in coating compositions. A number of such interpolymers which have found wide acceptance in the coatings field are disclosed, for example, in United States Patent No. 3,037,963. These interpolymers are employed as clear films or as resinous vehicles for enamels and other thermosetting compositions, and when so used provide very tough and mar resistant films having excellent adhesion and chemical resistance.

However, although compositions comprising these interpolymers provide coatings having outstanding properties for many applications, for some uses they have certain disadvantages. For example, when formulated as to provide optimum hardness and chemical resistance, they tend toward brittleness and for this reason, often require the presence of a plasticizer. This becomes especially troublesome because many conventional plasticizers cannot be successfully employed with the above interpolymers. For instance, chemical plasticizers such as sebacates and phosphates exude or "sweat out" of the cured film on aging. Also, ordinary plasticizers deleteriously affect the otherwise outstanding properties of these compositions, reducing their resistance to detergents, humidity, salt spray, and the like.

It has now been found that coating compositions having particularly good properties are obtained by blending the aforesaid interpolymers with a polyester containing unreacted epoxy groups in the polyester molecule. Such compositions provide numerous advantages, including exceptional flexibility and adhesion, particularly upon aging of the film, without detracting from other properties. Thus, while similar compositions made using conventional plasticizing additives, such as alkyd plasticizers, have quite desirable properties for many applications, protective coatings produced from the compositions of this invention have further improved characteristics such as excellent chemical resistance and durability, even on exterior exposure, in addition to outstanding flexibility and adhesion which permits the coated articles to be fabricated into various shapes without cracking or crazing.

The amide polymer component of the compositions of this invention can be any aldehyde-modified polymer of an unsaturated carboxylic acid amide; the aldehyde-modified interpolymer is preferably at least partially etherified. Aldehyde-modified amide polymers are obtained by polymerizing an unsaturated amide and at least one ethylenically unsaturated monomer and reacting the initial product of the polymerization with an aldehyde. Etherification is carried out by further reaction of the aldehyde-modified interpolymer with an alcohol. Alternatively, aldehyde-modified interpolymers are produced by interpolymerizing an aldehyde-modified amide, such as an alkylol amide, which may be then etherified, or by employing an N-alkoxy-alkyl amide.

In either case, the aldehyde-modified etherified amide polymer contains amido groups having a hydrogen atom replaced by the structure:

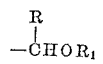

where R is hydrogen or an alkyl radical and $R_1$ is hydrogen or an organic radical.

Methods for producing N-alkoxyalkyl-substituted unsaturated carboxylic acid amides, such as N-butoxymethylacrylamide, which amides are quite useful to produce the amide polymers employed herein, are disclosed in United States Patent No. 3,079,434 and copending application Ser. No. 73,177, filed Dec. 2, 1960. When these and similarly substituted unsaturated carboxylic acid amides are polymerized, the resulting reaction product contains the aforesaid structure without any further treatment.

If, however, the unsaturated carboxylic acid amide does not contain such a structure, i.e., an unsubstituted amide is employed, the resulting amide polymer should be reacted with an aldehyde whereby such structure in which $R_1$ is hydrogen is produced by reaction of the aldehyde with an amido hydrogen atom to produce a hydroxyorgano group. When the aldehyde-modified product is also reacted with an alcohol, etherification of the hydroxyorgano groups by the alcohol takes place.

It is desirable to etherify at least part, and in many cases at least about half, of the hydroxyorgano groups of those amide interpolymers produced from unsubstituted or alkylol amides. Otherwise, problems of storage stability or premature gelation and flexibility of the coating may be encountered.

After etherification, the amide polymer contains amido groups having a hydrogen atom replaced by the structure:

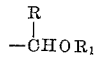

where R is hydrogen when the aldehyde employed is formaldehyde and an alkyl radical when other aliphatic aldehydes are used. $R_1$ represents the radical derived by removing a hydroxyl group from the etherifying alcohol, i.e., an organic radical, or in those groups not etherified, represents hydrogen. $R_1$ in the etherified groups can be, for example, alkyl or aryl. The terms "alkyl" and "aryl" as employed herein, are to be construed broadly; the groups represented by $R_1$ may include other substituents and functional groups which do not affect the properties of the product. Thus, $R_1$ may include unsaturated linkages, ether linkages, halogens and other substituents, or it may be cyclic.

Satisfactory products may in some instances be obtained with only a very small part of the hydroxyorgano groups having been etherified, in some instances 5 percent or less, but as mentioned, it is usually desirable that at least about 50 percent of the hydroxyorgano groups be etherified. Butanol is a preferred alcohol for use in the etherification, although any monohydric alcohol, such as methanol, ethanol, propanol, pentanol, octanol, decanol, and other alkanols containing up to about 20 or more carbon atoms, may also be employed, as may aromatic alcohols, such as benzyl alcohol; or cyclic alcohols, such as cyclohexanol; or the monoethers of glycols, such as butyl Cellosolve (ethylene glycol monobutyl ether), butyl Carbitol (diethylene glycol monobutyl ether), and other Cellosolves and Carbitols; or substituted alcohols, such as 3-chloropropanol.

While either acrylamide or methacrylamide is preferred for use in forming the interpolymer component, any unsaturated carboxylic acid amide can be employed. Such other amides include itaconic acid diamide, alpha-ethyl acrylamide, crotonamide, fumaric acid diamide, maleic acid diamide, and other amides of alpha, beta-ethylenically unsaturated carboxylic acids containing up to about 10 carbon atoms. Maleuric acid and esters thereof, and imide derivatives such as N-carbamyl maleimide, may also be utilized.

At least one other unsaturated monomer is interpolymerized with the unsaturated carboxylic acid amide; any polymerizable ethylenically unsaturated monomer can be so utilized. Such monomers include monoolefinic and diolefinic hydrocarbons, halogenated monoolefinic and diolefinic hydrocarbons, unsaturated esters of organic and inorganic acids, esters of unsaturated acids, nitriles, unsaturated acids, and the like. The interpolymer compositions described in United States Patent No. 3,037,963 are excellent examples of the preferred type of amide polymers utilized in the instant invention, and the many unsaturated compounds disclosed therein illustrate the numerous monomers which can be interpolymerized along with the amide.

Preferably, the amide polymer should contain from about 2 percent to about 50 percent by weight of the unsaturated carboxylic acid amide component, the balance being the other ethylenically unsaturated monomer(s).

In carrying out the polymerization reaction, a peroxygen type catalyst is ordinarily utilized. Useful catalysts for this purpose include acetal benzoyl peroxide, cyclohexanone peroxide, cyclohexyl hydroperoxide, cumene hydroperoxide, acetyl peroxide, lauroyl peroxide, benzoyl peroxide, methyl cyclohexyl hydroperoxide, di-t-butyl peroxide, peracetic acid, t-butyl permaleic acid, di-t-butyl diperphthalate, and the like. Azo compounds, such as p-methoxyphenyl diazothio-(2-naphthyl) ether and alpha, alpha'-azo-bis-isobutyronitrile, may also be used, as may redox catalyst systems. The quantity of catalyst employed can be varied considerably; however, in most instances it is desirable to utilize from about 0.1 to 2.0 percent.

In many instances, it is also desirable to add a chain-modifying or "short-stopping" agent to the polymerization mixture. Mercaptans are conventionally used for this purpose, but other chain-modifying agents, such as cyclopentadiene, allyl carbamate, alpha-methyl styrene, and the like, can also be used to secure low molecular weights, as can unsaturated fatty acids or esters.

The polymerization to produce the amide polymer is best carried out by admixing the amide, any other monomer or monomers, and the catalyst and chain-modifying agent, if any, in the solvent, and refluxing the resulting solution for a time sufficient to obtain the desired conversion. Ordinarily, the polymerization will be complete in about 1 to 16 hours. It is often desirable to add the catalyst in increments as the polymerization progresses, and good agitation and careful temperature control are also desirable because of the very rapid reaction rate and because the reaction is highly exothermic.

When necessary to produce the desired structures, the carboxylic acid amide is reacted with an aldehyde, preferably in the presence of an alcohol. Formaldehyde, in solution in water (Formalin) or in an alkanol such as butanol, or a formaldehyde-yielding substance such as paraformaldehyde, trioxymethylene or hexamethylenetetramine, is greately preferred. However, other aldehydes, including acetaldehyde, butyraldehyde, furfural, and the like, preferably containing only atoms of carbon, hydrogen and oxygen, can be used. It is ordinarily preferred to utilize about 2 equivalents of aldehyde for each amide group present in the interpolymer, although this ratio may be raised or lowered considerably if desired. For example, the ratio may be as high as 3.0 equivalents or as low as about 0.2 equivalent of aldehyde for each amide group in the interpolymer.

The reaction is preferably carried out by refluxing the aldehyde and the polymer in the presence of a mild acid catalyst, such as maleic anhydride. Other acid catalysts, such as oxalic acid, hydrochloric acid or sulfuric acid, may also be employed, although there is some possibility of gelation occurring if the acid catalyst is too strongly acidic. The quantity of catalyst utilized may be varied widely; the more acidic the reaction medium, the greater the amount of etherification which will occur.

In formulating the coating compositions of the invention, the above amide interpolymers are blended with a polyester containing unreacted epoxy groups in the polyester molecules. These are obtained by reacting a polyester of a epoxide with a preformed esterification product of a polyhydric alcohol and a polycarboxylic acid, using at least about 1 mole of the polyepoxide per unreacted carboxyl equivalent in the preformed esterification product. The resulting polyester contains unreacted epoxy groups and provides many of the desirable properties which make the coating compositions herein uniquely valuable.

The preformed esterification products employed in producing the epoxy-containing polyesters are polymeric esters of a polycarboxylic acid and a polyhydric alcohol. In place of the polycarboxylic acid, there may be employed the corresponding anhydride of those acids which form anhydrides, and throughout this specification the use of the term "polycarboxylic acids" is considered to include such anhydrides. In general, these esterification products have sufficient unreacted carboxyl groups so that they have an acid number of at least about 5. "Acid number," as that term is used herein, is defined as the milligrams of potassium hydroxide required to neutralize 1 gram of sample.

The esterification product may be saturated or unsaturated and may be produced from various polycarboxylic acids. Among the acids which may be employed are adipic acid, succinic acid, phthalic acid, isophthalic acid, terephthalic acid, diglycolic acid, oxalic aid, sebacic acid, azaleic acid, malic acid, glutaric acid, diphenic acid, maleic acid, fumaric acid, chlorendic acid, tetrachlorophthalic acid, and similar polycarboxylic acids of varying types. The esterification product may also include in addition to the polycarboxylic acid, minor proportions of one or more monobasic acids, for example, benzoic acid or the various fatty acids, such as oleic acid, linoleic acid and linolenic acid, and saturated acids such as lauric acid, myristic acid, palmitic acid and stearic acid, or mixtures of such acids.

Similarly, the preformed ester can be an oil-modified resin, such as the well-known oil-modified alkyds, containing such oils as coconut oil, soybean oil, linseed oil, and the like. Also, the esterification product may include other copolymerized monomers, such as esters of acrylic acid and methacrylic acid, acrylonitrile, olefinic hydrocarbons, or other polymerizable ethylenically unsaturated monomers.

Essentially any polyhydric alcohol can be utilized in producing the preformed esterification products herein, provided that the ratio of the alcohol and the polycarboxylic acid and the reaction conditions are chosen so as to produce an esterification product having unreacted carboxyl groups and which is ungelled. Among the polyhydric alcohols ordinarily employed are such polyols as ethylene glycol, propylene glycol, diethylene glycol, dipropylene glycol, triethylene glycol, neopentyl glycol, 1,4-butanediol, 1,5-pentanediol, trimethylene glycol, polyethylene glycol, trimethylolethane, trimethylolpropane, glycerol, 1,2,6-hexanetriol, pentaerythritol, sorbitol, methyl glucoside, mannitol, and similar polyols having a plurality (e.g., up to about 6) of hydroxyl groups.

The preformed esterification product is produced by conventional techniques ordinarily employed in making polyesters of the types described. Either fusion or solvent processes may be employed. The reaction is carried out using ratios of reactants and/or reaction times so as to result in a product having unreacted carboxyl groups derived from the carboxylic acid or acids utilized, as shown by the acid number of the product. It may be noted that if a catalyst is employed, it is best to avoid Lewis acid catalysts and similar catalysts which may later promote etherification between the polyepoxide and any residual hydroxyl groups in the esterification product.

The epoxy-containing polyester is produced by reacting the preformed esterification products as described above with a polyepoxide.

The polyepoxide can be any epoxide compound or mixture which has a 1,2-epoxy equivalency of greater than 1.0, that is, in which the average number of 1,2-epoxy groups per molecule is greater than 1. The average number of epoxy groups may be a fractional number and in general is less than 4.0. These polyepoxides comprise a relatively large class of materials and have been described in numerous patents. Some of these patents are United States Patents Nos. 2,467,171, 2,615,007, 2,716,123, 3,030,336, 3,053,855, and 3,075,999.

Among the polyepoxides which can be used herein are the polyglycidyl ethers of polyphenols, such as bisphenol A. These may be attained, for example, by etherification of a polyphenol with epichlorohydrin or dichlorohydrin in the presence of an alkali. The phenolic compound may be bis(4-hydroxy-phenyl)2,2-propane, 4,4'-dihydroxygenzophenone, bis(4 - hydroxy - phenyl)1,1-ethane, bis(4 - hydroxy - phenyl)1,1-isobutane, bis(4-hydroxy - phenyl)2,2-propane, bis(4-hydroxy-tertiary butyl phenyl)2,2 - propane, bis(2-hydroxy-naphthyl)-methane, 1,5-dihydroxy-naphthalene, or the like. The polyphenol can also be a novolak resin or a similar polyphenol resin.

Such polyglycidyl ethers of polyphenols correspond to the average formula:

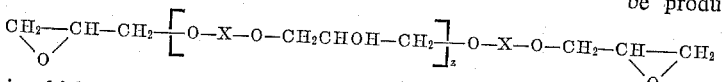

in which X represents an aromatic radical, and z represents a whole or fractional small number.

Examples of this class of polyepoxides are the reaction products of bisphenol A and epichlorohydrin, which correspond to the structure:

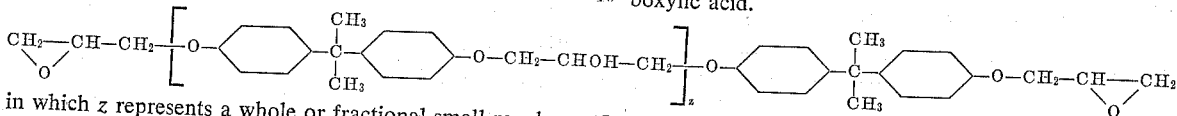

in which z represents a whole or fractional small number.

Also suitable are the similar polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 2,4,6-hexanetriol, glycerol, and the like.

Also suitable are polyglycidyl esters of polycarboxylic acids which are produced by the reaction of epichlorohydrin or a similar epoxy compound with an aliphatic or aromatic polycarboxylic acid, such as oxalic acid, succinic acid, glutaric acid, adipic acid, azelaic acid, phthalic acid, isophthalic acid, terephthalic acid, 2,6-naphthylene dicarboxylic acid, dimerized linolenic acid, and the like. Examples are diglycidyl adipate and diglycidyl phthalate, and similar esters which correspond to the formula:

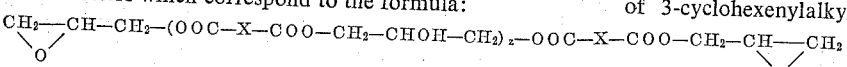

in which X represents a hydrocarbon radical, such as a phenyl or other aromatic radical or an aliphatic radical, and z represents a whole or fractional small number.

While the foregoing polyepoxides produce desirable coating compositions, for certain purposes such as, for example, when the composition is to be employed in finishes which are to be exposed to the weather, it is prefered to employ epoxy-containing polyesters produced by reacting the preformed esterification products as described above with a polyepoxide derived from the epoxidation of an olefinically unsaturated alicyclic compound. Included are diepoxides and higher epoxies, as well as mixtures of epoxides comprising in part one or more monoepoxides. These polyepoxides are non-phenolic and are obtained by epoxidation of alicyclic olefins, for example, by oxygen and selected metal catalysts, by perbenzoic acid, by acetaldehyde monoperacetate, or by peracetic acid.

Among the polyepoxides derived from the epoxidation of alicyclic compounds are those of the formula:

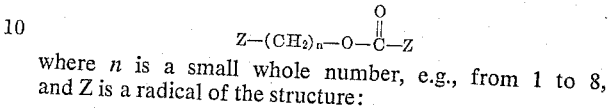

where $n$ is a small whole number, e.g., from 1 to 8, and Z is a radical of the structure:

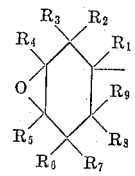

where $R_1$ through $R_9$ are hydrogen or lower alkyl radicals, i.e., having up to about 8 carbon atoms. Examples of these polyepoxides are described in United States Patent No. 2,716,123.

There may also be employed the corresponding diesters of the formula:

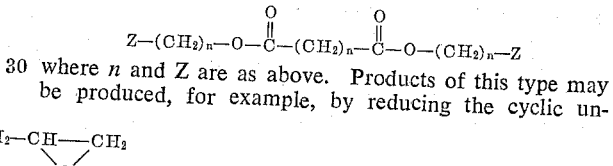

where $n$ and Z are as above. Products of this type may be produced, for example, by reducing the cyclic unsaturated aldehyde from the Diels-Alder reaction of crotonaldehyde and butadiene (or similar reactants) to the corresponding alcohol and reacting 2 moles of this alcohol with 1 mole of sebacic acid or a similar dicarboxylic acid.

Other polyepoxides from the epoxidation of olefinically unsaturated alicyclic compounds are those of the formula:

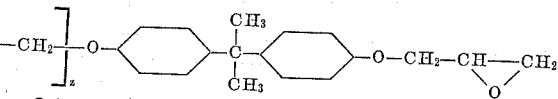

where Z and $n$ are as above and the group ($C_mH_{2m-1}O$) is an epoxyalkyl group, preferably having from 8 to 16 carbon atoms. These compounds may be produced by the epoxidation of a 3-cyclohexenylalkyl ester of a monounsaturated fatty acid, for example, with peracetic acid. Examples of these compounds are disclosed in United States Patent No. 2,786,066.

Higher epoxides are produced from the similar reaction of 3-cyclohexenylalkyl esters of polyunsaturated fatty acids, and these can also be employed in the invention. These include, for example, the polyepoxides of United States Patent No. 2,786,067 and others having the formula:

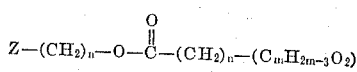

where Z and $n$ are as above and ($C_mH_{2m-3}O_2$) is a diepoxyalkyl radical.

Other polyepoxides from the epoxidation of olefinically unsaturated alicyclic compounds are the epoxyalicyclic ethers which correspond to the above-described epoxyalicyclic esters. For example, these have the formula:

$$Z-(CH_2)_n-O-(CH_2)_n-Z$$

where Z and n are as above. They may be obtained by the epoxidation of dicyclopentadiene.

Epoxy-containing polyesters are produced from the foregoing preformed esterification products and polyepoxides by reacting at least about 1 mole of the polyepoxide with each unreacted carboxyl equivalent in the esterification product. The reaction generally requires elevated temperatures, although the specific temperature required varies with the particular reactants employed. The temperature should be sufficiently high so as to cause reaction of the epoxy groups in the polyepoxide with the unesterified carboxyl groups in the esterification product at an appreciable rate, but should not be high enough to cause substantial further esterification of the preformed esterification product, although in some cases some additional esterification can be tolerated. In most instances, the temperature of reaction is between about 250° F. and 500° F.

To illustrate the manner of producing the epoxy-containing polyesters which are employed herein, there are set forth below several examples of their preparation. The parts and percentages in the examples, as throughout the specification, are by weight and are based upon nonvolatile resin solids content.

Example A

A reaction vessel is charged with 1929 parts of adipic acid, 214 parts of azaleic acid and 1479 parts of 1,4-butanediol. This mixture is heated to 440° F. and held at that temperature for 3 hours while removing the water of reaction. The esterification product thus produced has an acid number of 19.0. There are added 300 parts of 3,4-epoxy - 6 - methylcyclohexylmethyl - 3,4 - epoxy-6-methylcyclohexanecarboxylate (Unox Epoxide 201) and this mixture is heated at 360° F. for about 5 hours. After the addition of 1083 parts of isopropyl acetate, the solution obtained has the following properties:

Acid number ------------------------------ 2.2
Hydroxyl value --------------------------- 79.2
Epoxide equivalent ----------------------- 5700
Solids content, percent ------------------ 76.1

Other examples of epoxy-containing polyesters are produced by substituting in the above examples various preformed esterification products and polyepoxides as set forth below.

Example B

The preformed esterification product of Example A is reacted with 400 parts of a polyepoxide from the reaction of bisphenol A and epichlorohydrin, having an epoxide equivalent of 175 to 210 and an average molecular weight of 350 to 400. This polyepoxide is known as Epon 828. There may be employed instead, the polyepoxides of similar properties known commercially as ERL-2774 and Epi-Rez 510.

Example C

Example A is repeated, except that the preformed esterification product is made from 948 parts of 1,4-butanediol, 494 parts of trimethylolethane, 692 parts of isophthalic acid and 1141 parts of sebacic acid.

Example D

A mixture of 966 parts of coconut fatty acid, 74 parts of p-tertiary butyl benzoic acid, 1006 parts of trimethylolethane and 1187 parts of phthalic anhydride is heated with about 120 parts of xylene (as a reflux solvent) at 440° F. until the product has an acid number of 20. There are then added 321 parts of the polyepoxide employed in Example A and the mixture heated at 380° F. until the acid number is slightly less than 4.

Example E

A preformed esterification product is made as in Example A, except that the reaction is stopped when the product has an acid number of 37. With this product there are reacted 600 parts of 3,4-epoxy-6-methylcyclohexylmethyl - 3,4-epoxy-6-methylcyclohexanecarboxylate. The epoxy-containing polyester obtained has nearly twice the number of unreacted 1,2-epoxy groups as that of Example A.

Example F

Example A is repeated, except that in place of the polyepoxide therein there are employed 400 parts of 3,4-epoxycyclohexylmethyl-9,10-epoxypalmitate.

Example G

Example A is repeated, except that in place of the polyepoxide therein there are used 425 parts of 3,4-epoxycyclohexylmethyl-9,10,12,13-diepoxystearate.

The proportions of the amide interpolymer and the epoxy-containing polyester can be varied widely, depending in large part upon the particular use for which the coating composition is intended. In general, useful compositions having good properties are obtained when the epoxy-containing polyester comprises from 3 to 50 percent of the composition based upon the total nonvolatile resin solids. As indicated above, the preferred ranges of the components may vary with the intended use, and also with the degree of flexibility and other properties of the particular amide interpolymer employed.

The resinous compositions herein can be applied as coatings by any conventional application method, such as by spraying, roll coating, brushing and the like. Ordinarily, the composition will include one or more solvents, and the choice of solvents and the concentration of the resinous components in the solvent mixture are chosen with reference to the desired manner in which the composition is to be applied. After application, the compositions are dried and baked at elevated temperatures to produce a hard, infusible film. The baking schedules employed also depend upon the nature of the particular composition, the nature of the substrate, and the manner in which it is to be used. The inclusion of an acid monomer in the amide polymer, or addition of various agents will lower the effective curing temperature. Generally speaking, baking temperatures of at least 200° F. and preferably 300° F. are employed.

Set forth below are several examples of the manner of producing the resinous compositions described herein. In these examples (unless otherwise described), the amide interpolymers are produced by charging the reactive monomers into a reaction vessel along with solvent, a mercaptan or other chain-modifying agent and catalyst. The amount of catalyst added initially is generally 1 percent by weight of the reactive monomers. This mixture is refluxed for 8 hours, with 0.5 percent portions of additional catalyst being added after the second, fourth, sixth and eighth hours. There are then added an aldehyde and an alcohol (usually butyl Formcel, which is a 40 percent solution of formaldehyde in n-butanol), along with maleic anhydride or a similar mild acid catalyst and additional solvent. This mixture is then refluxed for 3 hours while removing water azeotropically. The product is cooled and sufficient solvent added to produce a solution of the desired nonvolatile solids content.

Example H

An interpolymer is produced from the following reactive monomers:

| | Parts by wt. |
|---|---|
| Acrylamide | 10 |
| Styrene | 55 |
| Methacrylic acid | 5 |
| Ethyl acrylate | 130 |

The above are polymerized using a total of 6 parts of cumene hydroperoxide catalyst and 2 parts of tertiary dodecyl mercaptan, and the polymer is further reacted with 21.2 parts of butyl Formcel in the presence of 0.27 part of maleic anhydride. The reactions are carried out in a solvent mixture of 50 parts of butanol and 150 parts of high boiling aromatic naphtha (Solvesso 150), and the polymer solution produced has a solids content of 50 percent and a Gardner-Holdt viscosity of U to W.

Example I

The monomers employed in making the interpolymer of this example are as follows:

| | Parts by wt. |
|---|---|
| Acrylamide | 30 |
| Styrene | 77 |
| Methacrylic acid | 5 |
| Ethyl acrylate | 88 |

The polymer is produced using 6 parts of cumene hydroperoxide and 3 parts of tertiary dodecyl mercaptan, and is further reacted with 63.5 parts of butyl Formcel in the presence of 0.85 part of maleic anhydride. The solvents used are 125 parts of Solvesso 150 and 100 parts of butanol, and the polymer solution is blended with 25 parts of a reaction product of bisphenol A and epichlorohydrin having an epoxide equivalent of 450 to 525 (Epon 1001). The product has a solids content of 50 percent and a Gardner-Holdt viscosity of U to W.

Example J

The following monomers are employed in this example:

| | Parts by wt. |
|---|---|
| Acrylamide | 30 |
| Methacrylic acid | 7.5 |
| Styrene | 262.5 |

These are reacted in the presence of a total of 9 parts of cumene hydroperoxide and 3.75 parts of tertiary dodecyl mercaptan. The polymer is modified by reaction with 63.6 parts of butyl Formcel and 0.8 part of maleic anhydride. The solvent mixture utilized includes 75 parts of butanol, 75 parts of xylene and 150 parts of toluene.

Example K

An interpolymer is produced from the following:

| | Parts by wt. |
|---|---|
| Acrylamide | 30 |
| Methacrylic acid | 5 |
| Styrene | 77 |
| Methyl methacrylate | 88 |

The interpolymerization is carried out using a total of 6 parts of tertiary dodecyl mercaptan and 5 parts of cumene hydroperoxide, and the polymer is further reacted with 63 parts of butyl Formcel, along with 0.8 part of maleic anhydride. The solvents employed in this example include 100 parts of butanol and 100 parts of toluene, with the product having a solids content of about 50 percent and a Gardner-Holdt viscosity of W to Y.

Example L

In this example, the following monomers are employed:

| | Parts by wt. |
|---|---|
| Acrylamide | 27.0 |
| Methacrylic acid | 6.75 |
| Hydroxyethyl methacrylate | 13.5 |
| Methyl methacrylate | 65.0 |
| Styrene | 104.0 |
| 2-ethyl hexyl acrylate | 54.0 |

A total of 8.1 parts of cumene hydroperoxide and 4.1 parts of tertiary dodecyl mercaptan are utilized in carrying out the reaction, and the polymer produced is modified by reaction with 57.0 parts of butyl Formcel in the presence of 0.72 part of maleic anhydride. The solvents employed are 135 parts of butanol and 135 parts of xylene, giving a product having a solids content of about 50 percent and a Gardner-Holdt viscosity of W to Y.

Example M

An interpolymer is prepared from a mixture of the following components:

| | Parts by wt. |
|---|---|
| N-butoxymethyl acrylamide | 198 |
| Styrene | 231 |
| Ethyl acrylate | 264 |
| Methacrylic acid | 15 |
| Butanol | 354 |
| Toluene | 354 |

The above mixture is refluxed for 2 hours in the presence of 7 parts of cumene hydroperoxide and 7 parts of tertiary dodecyl mercaptan, and then for three more successive 2-hour reflux periods, after each of which were added 3.5 parts of cumene hydroperoxide. During the last two reflux periods, the formed water was removed by azeotropic distillation. The resulting resinous product has a solids content of 50 percent and a Gardner-Holdt viscosity of T to U.

The above amide interpolymers and epoxy-containing polyesters are formulated into coating compositions having the desirable properties described herein, as illustrated by the following:

Example 1

Eighty (80) parts of the amide interpolymer of Example H were blended with 20 parts of the interpolymer of Example I (the parts being based on nonvolatile resin solids). A vehicle for a coating composition was produced by mixing 90 parts of the aforesaid blend of interpolymers with 10 parts of the epoxy-containing polyester of Example A. A white flat siding enamel was then formulated from this vehicle and conventional pigments (comprising chiefly about a 1 to 1 proportion of titanium dioxide and silica); the pigment-to-vehicle ratio was 1.4 to 1.

The above enamel, upon being coated on aluminum and baked at 500° F. for 60 seconds, produced a hard, adherent film having excellent adhesion, flexibility, durability and hardness, in addition to good appearance.

To demonstrate the advantageous properties of the above coating composition, it was compared with panels coated in the same manner with similar compositions. Each of these was the same as the above composition, except that in one the vehicle was the amide interpolymer blend without the addition of the epoxy polyester, and in the other the vehicle was the same amide interpolymer blend to which was added 10 percent by weight of a conventional high molecular weight polyester plasticizer (Paraplex G-41). The coating produced from Example 1 exhibited superior properties, especially in achieving greater flexibility without sacrificing hardness. Its advantages in this respect are shown in Table I.

TABLE I

| Vehicle Composition | Pencil Hardness | Flexibility* |
|---|---|---|
| Amide polymer | H | Very poor. |
| Example 1 | F | Good. |
| Amide polymer+G-41 | HB | Fair. |

* 180° cleat bend on 0.019 inch treated aluminum.

Similar advantageous properties are obtained from resinous compositions employing the various amide interpolymers and epoxy-containing polyesters described and exemplified above. A number of examples of such coating compositions are set forth in Table II below:

TABLE II

| Example No. | Amide Polymer | | Epoxy-Polyester | |
|---|---|---|---|---|
| | Example | Parts | Example | Parts |
| 2 | J | 70 | A | 30 |
| 3 | K | 70 | A | 30 |
| 4 | L | 75 | A | 25 |
| 5 | M | 85 | A | 15 |
| 6 | H | 90 | B | 10 |
| 7 | H | 80 | C | 20 |
| 8 | H | 75 | D | 25 |
| 9 | H | 90 | E | 10 |
| 10 | H | 90 | F | 10 |
| 11 | H | 90 | G | 10 |

According to the provisions of the patent statutes, there are described above the invention and what are now considered to be its best embodiments. However, within the scope of the appended claims, it is to be understood that the invention can be practiced otherwise than as specifically described.

I claim:

1. A resinous composition comprising (1) an interpolymer of from about 2 to about 50 percent by weight of an unsaturated carboxylic acid amide and at least one other polymerizable ethylenically unsaturated monomer, said interpolymer being characterized by containing amido hydrogen atoms replaced by the structure:

where R is selected from the group consisting of hydrogen and alkyl radicals, and $R_1$ is selected from the group consisting of hydrogen and organic radicals, and (2) from about 3 to about 50 percent by weight of a preformed polyester containing unreacted 1,2-epoxy groups in the polyester molecules, said polyester being the reaction product of a polyepoxide having a 1,2-epoxy equivalency of greater than 1.0 with a preformed esterification product of a polyhydric alcohol and a polycarboxylic acid, said esterification product having an acid number of at least about 5, using at least about 1 mole of the polyepoxide per unreacted carboxyl equivalent in the preformed esterification product.

2. The composition of claim 1 in which said unsaturated carboxylic acid amide is acrylamide.

3. The composition of claim 1 in which said structure is a butoxymethyl group.

4. The composition of claim 1 in which at least about 50 percent of the amido groups have a hydrogen atom replaced by the structure:

$$-CH_2OR_1$$

where $R_1$ is lower alkyl.

5. The composition of claim 1 in which said structure is $-CH_2OR_1$, where $R_1$ is lower alkyl.

6. The composition of claim 1 in which the polyester is the reaction product of a polyepoxide produced by the epoxidation of an olefinically unsaturated compound.

7. The composition of claim 6 in which said olefinically unsaturated compound is an olefinically unsaturated alicyclic compound.

8. The composition of claim 6 in which the polyester is produced from 3,4-epoxy-6-methylcyclohexylmethyl-3,4-epoxy-6-methylcyclohexanecarboxylate.

9. The composition of claim 6 in which the polyester is the reaction product of a polyepoxide which is a polyglycidyl ether of a polyhydric compound.

References Cited by the Examiner

UNITED STATES PATENTS 3,062,776  11/1962  Gaylord _____ 260—834
3,222,321  12/1965  Sekamakas _____ 260—834
3,242,111  3/1966  Michelotti _____ 260—834

MURRAY TILLMAN, *Primary Examiner.*

PAUL LIEBERMAN, *Assistant Examiner.*